No. 661,622. Patented Nov. 13, 1900.
F. S. SEYMOUR.
WATER SUPPLY REGULATOR.
(Application filed Aug. 10, 1899.)
(No Model.) 2 Sheets—Sheet 1.
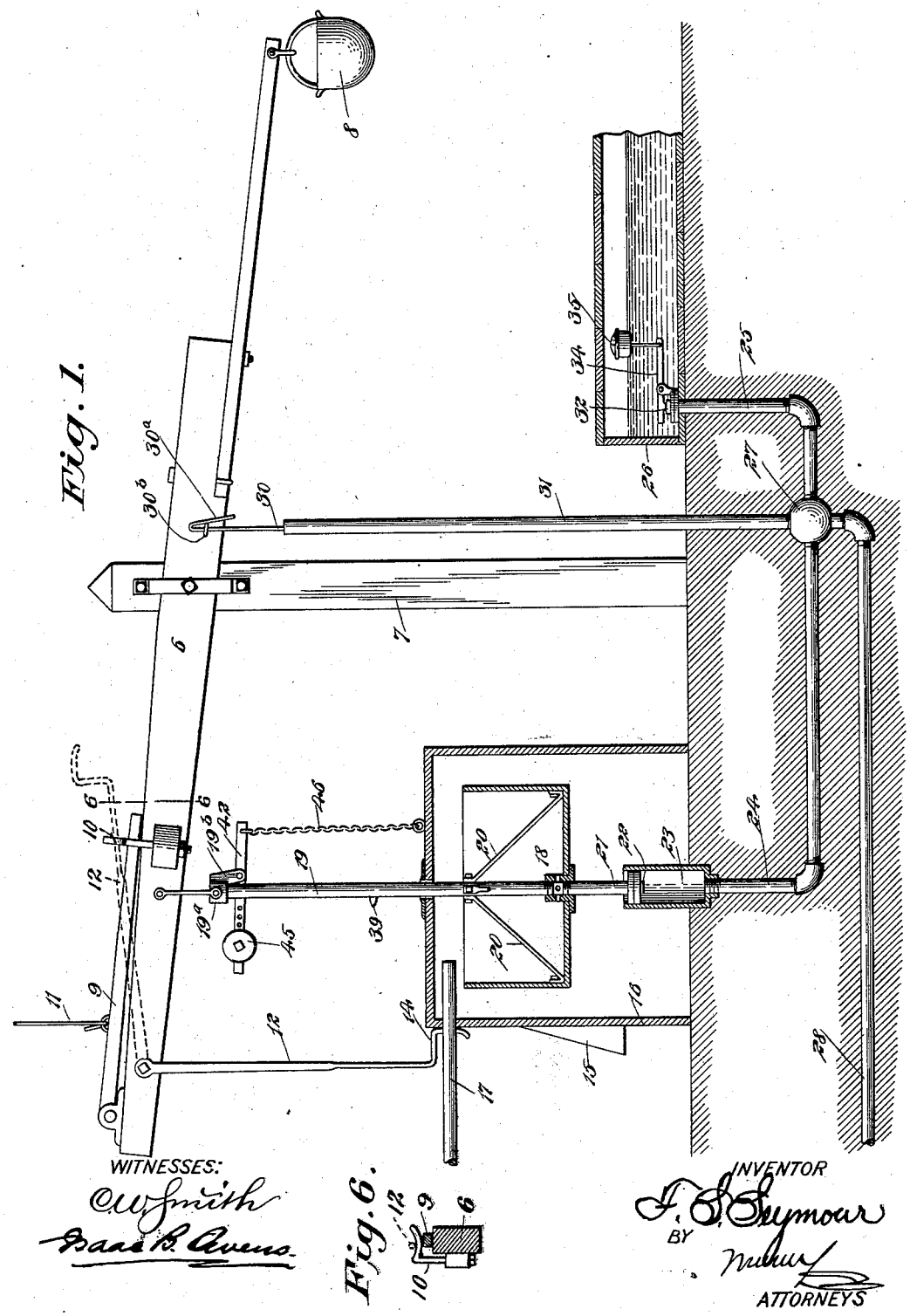

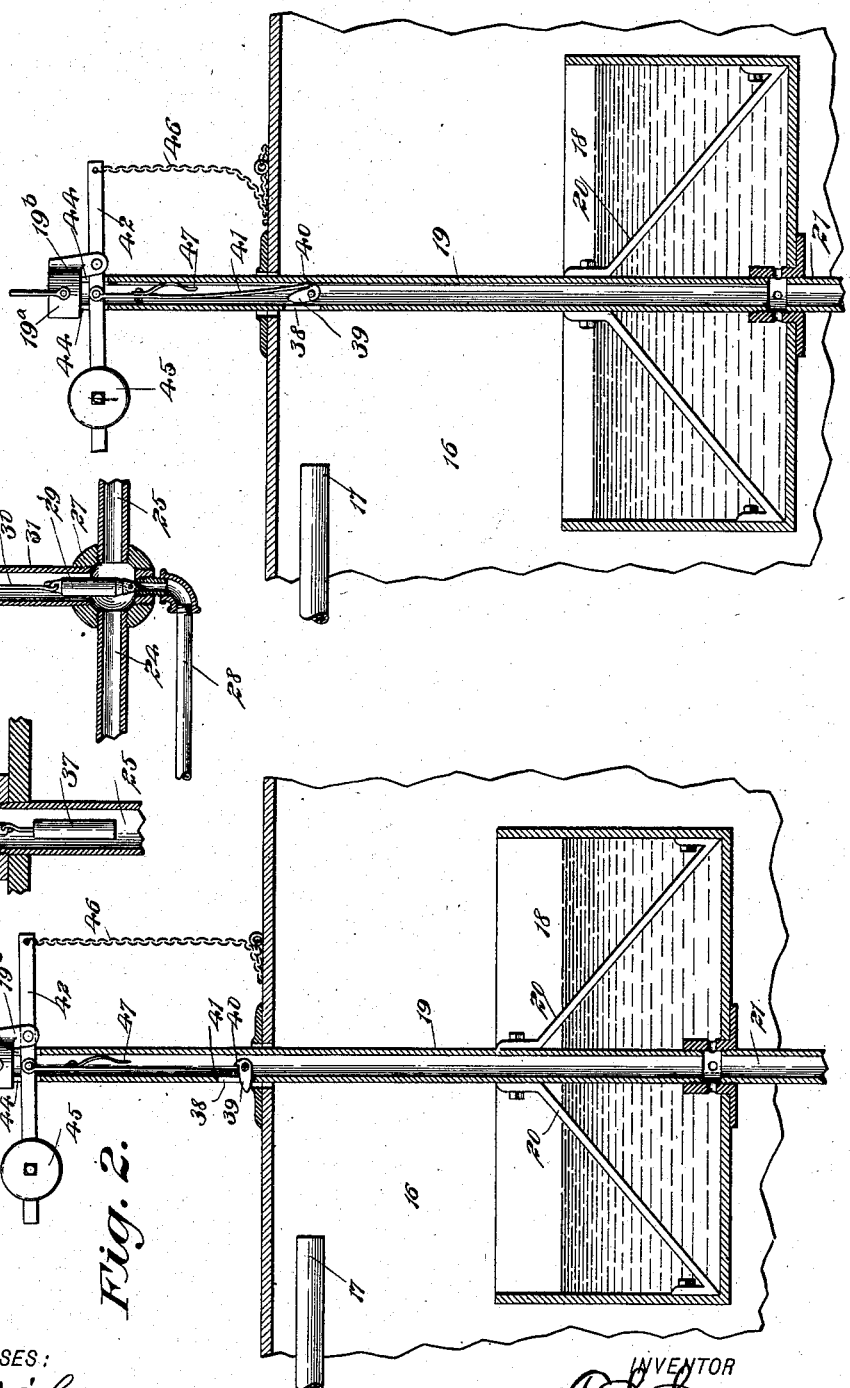

UNITED STATES PATENT OFFICE.

FREDERICK S. SEYMOUR, OF DUBUQUE, IOWA.

WATER-SUPPLY REGULATOR.

SPECIFICATION forming part of Letters Patent No. 661,622, dated November 13, 1900.

Application filed August 10, 1899. Serial No. 726,835. (No model.)

*To all whom it may concern:*

Be it known that I, FREDERICK S. SEYMOUR, of Dubuque, in the county of Dubuque and State of Iowa, have invented a new and Improved Water-Supply Regulator, of which the following is a full, clear, and exact description.

The purpose of this invention is to provide means for controlling the supply of water to a tank or other receptacle, the apparatus having cut-off devices in connection with water forcing or supply apparatus and involving a pan in which the water backs from the trough when full, so that when the pan drops by the weight of the water the cut-off devices will be operated.

This specification is the disclosure of one form of my invention, while the claims define the actual scope thereof.

Reference is to be had to the accompanying drawings, forming a part of this specification, in which similar characters of reference indicate corresponding parts in all the views.

Figure 1 is an elevational view of the invention with parts in section, showing the apparatus in position to admit the supply of water. Fig. 2 is an enlarged section of the pan and coacting parts, including the dog for regulating the fall of the pan, the parts being shown in the first step of their operation. Fig. 3 is a similar view of the same parts, except that they are shown in the last step of their operation. Fig. 4 is a detail of the device employed to drain off the piping when the weather is cold. Fig. 5 is a detail section of the automatic valve for regulating the feed of water into the tank, and Fig. 6 is a detail section on the rod 6 6 of Fig. 1.

The invention is adapted particularly to controlling windmill-operated pumps, and the apparatus here shown is arranged for this work. A wooden lever 6 is fulcrumed on a standard or other support 7 and has at one end a suitable weight 8 and at the other end a pivoted arm 9, which may be held fast alongside the lever 6 by means of a swinging catch 10. (See Figs. 1 and 6.) By throwing the catch 10 to one side the arm may be released. The arm 9 has connection with a rod 11, which extends to the windmill, having connection therewith in any suitable manner, so as to throw the same into and out of gear.

When the arm 9 is held alongside of the lever 6 in the manner shown, the rod 11 will be rendered fast to the lever 6; but should the catch 10 be disengaged from the arm 9 it will be seen that the movement or position of the lever 6 will not affect the rod 11. The use of this arrangement will be fully described hereinafter. The lever 6 is shown in Fig. 1 in its raised position or inactive, in which position it will be assumed that the windmill is permitted to operate. When the lever 6 is thrown down to stop the operation of the windmill, the lever may, if desired, be held in such position by means of a swinging lock-arm 12, having a bent lower end 14, engaging with a shoulder 15, attached to a casing 16, mounted below the lever 6. When it is desired that the arm 12 shall not operate, the arm may be thrown upon the catch 10, so as to be supported thereby, as shown by dotted lines in Fig. 1.

The water-supply is furnished through a pipe 17, which leads into the casing 16 and discharges into a pan 18. This pan is supported rigidly on a rod 19, which is preferably tubular and which has at its upper end a cap $19^a$, shackled to the lever 6. Braces 20 may be provided to strengthen the pan 18 on the rod, if desired. Communicating with the interior of the pan 18 and extending downward therefrom is a tube 21, which has a piston 22 working in a cylinder 23. The cylinder 23 communicates with a pipe 24, so that the water may pass from the pan 18, through the parts 21 and 23, into the pipe 24. The purpose of the parts 22 and 23 is to permit the movement of the pipe 21 with the pan 18 without interrupting the communication between the pipes 21 and 24. The pipe 24 has communication with a pipe 25, passing to a tank 26, such communication being effected by a cross-coupling 27. The cross-coupling 27 may be drained by means of a pipe 28, which passes from the bottom thereof to carry off the water to any desired point, thus avoiding leaving water standing within the pipes 24 and 25 and avoiding the freezing of such water. A weighted valve-plug 29 is mounted in the coupling 27 and seats in an opening in the bottom of the coupling 27, whereby it normally will close the pipe from communication with the coupling. The valve 29 has connection with a rod 30, which passes up through a pipe 31 to and into connection with the lever 6, such connection being effected by a hook 30$^a$ on the rod engaging a staple 30$^b$ on the lever 6. When the lever 6 moves to the position shown in Fig. 1 and the water is flowing through the pipes 24 and 25, the valve 29 also drops to the position shown in Fig. 5 and the pipe 28 is closed; but when the right-hand end of the lever 6 nearly reaches the limit of its upward movement the rod 30 is raised, thus lifting the valve 29 and opening the pipe 28 and permitting the water to run out from the pipes 24 and 25. It will be observed that owing to the sliding engagement between the parts 30$^a$ and 30$^b$ the rod 30 is not lifted until the right-hand end of the lever 6 is nearly raised. In warm weather when the valve 29 is not necessary the rod 30 may be disconnected from the lever 6 by drawing it out of the staple 30$^b$.

The tank 26 may be of any desired construction and contains an automatic float-valve for regulating the flow of water from the pipe 25. These devices (see Figs. 1 and 4) comprise a leather clack 32, mounted on a seat 33, situated over the upper end of the pipe 25. A float-lever 34 is fulcrumed on an upward extension of the seat 33, and one end of the lever bears on the clack 32 to force the same into closed position. The other end of the lever 34 carries a float 35, which is influenced by the water within the tank and which when the water is at a sufficient level serves to strain on the lever 34, and thus to close the valve 32. The valve 32 has a pin 36 connected therewith, to which in turn is attached an elongated float 37, suspended in the upper portion of the pipe 25. Now when the water rises in the pipe 25 it lifts the float 37 and relieves the clack 32 of the weight of the float, thus not in any way hindering the operation of the valve to open; but when the water does not rise in the pipe 25 the weight of the float 37 will hold the clack 32 down without any action of the lever 34. This arrangement is particularly useful in freezing weather, when the tank 26 is only partly filled with water and there is no water running in the pipe 25 from the pump from lack of wind. At this time the valve or clack 32 is held closed tight by the float 37 and pin 36, allowing no leakage into the pipe 25, which might otherwise occur under certain conditions.

As best shown in Figs. 2 and 3, the tubular rod 19 passes up through an opening in the casing 16 and has an opening 38 cut in its side, through which a portion of a dog 39 is movable. This dog is pivoted within the tubular rod. The dog 39 has its inner portion provided with a spur 40, at the base of which bears an arm 41. The arm 41 is attached to a lever 42, which is fulcrumed between lugs 19$^b$ on the cap 19$^a$ of the rod 19. The lever 42 extends through openings 44 in the tubular rod 19 and has at one end an adjustable weight 45, and at the other end a chain 46 is connected with the lever and passes downward to connection with the casing 16. At a point within the rod 19 the lever 42 has connection with the arm 41, and this arm 41 is provided with a spring 47, which bears against the inner wall of the rod 19 and serves to throw the arm 41 to the left. (See Fig. 2.) When the rod 19 is raised to the position shown in Fig. 1, the chain 46 becomes taut and takes the strain of the weight 45, thus holding the lever 42 in an inclined position and raising the arm 41 out of engagement with the dog 39, (see Fig. 1;) but when the rod 19 drops to the position shown in Fig. 2 the chain 46 is slackened and the weight 45 is permitted to drop, carrying with it the lever 42 and throwing the arm 41 into engagement with the dog 39, thus holding the dog in the horizontal position shown in Fig. 2 and causing the outer portion of the dog to engage with the top of the casing 16 momentarily to prevent the further fall of the rod 19; but when the downward strain on the rod 19 becomes sufficiently great to overcome the force of the weight 45 the outer portion of the dog 39 is thrown up and the arm 41 is moved against the tendency of its spring 47, causing the arm 41 to bear on the spur 40 of the dog 39 and permitting the dog to assume a position entirely within the tubular rod 19. (See Fig. 3.) This therefore removes the previously-existing restraint to the continued descent of the rod 19 and its attached parts.

In the operation of the apparatus, assuming that the tank 26 is empty and the valve 32 consequently open, the lever 6 is thrown to the position shown in Fig. 1, thus permitting the operation, say, for example, of the windmill. This position of the lever 6 causes the valve 29 to be closed, and the water passing from the supply-pipe 17 to the pan 18 flows from the pan into the pipe 21 and from thence to the cylinder 23 and pipe 24, the water reaching the tank by way of the pipe 25. When the tank 26 becomes full, the float 35 is raised and the valve 32 is closed. The water then backs in the pipes 25 24, cylinder 23, and pipe 21 and begins to fill the pan 18. The weight of the water thus suspended on the rod 19 causes the rod to descend, throwing with it the lever 6 and rod 11. As the rod 19, with its attached parts, moves downward from the position shown in Fig. 1 to that shown in Fig. 2 the lever 42, as before described, is permitted to drop, causing the arm 41 to engage the dog 39 and momentarily arrest the further movement of the rod 19, owing to the engagement of the dog 39 with the casing 16. The water now continues to rise in the pan 18, and finally the weight of this water becomes so great that the force of the weight 45 is overcome and the dog 39 is caused to swing upward, thus allowing the complete descent of the rod 19 and its attached parts to take place. (See Fig. 3.) As this continued movement of the rod 19 occurs the final movement of the lever 6 is effected and the water-supply mechanism will now be thrown entirely out of gear. The purpose of the devices for momentarily arresting the descent of the rod 19 is to permit sufficient water to be run into the tank to efficiently throw the windmill or other apparatus out of gear, the parts (including the weight 45) being adjusted so that when the weight of the water in the pan 18 is sufficient to throw up the weight 45 it is also sufficient to completely throw the windmill out of the wind. Simultaneously the arm 12 locks with the shoulder 15. If desired, the arm 12 may be thrown out of the position shown in Fig. 1 or entirely disconnected from the lever 6, so that the lever will be held down only by the weight of the water in the pan 18. This will allow the lever to automatically rise by the action of the weight 8 should the water in the tank or trough 26 become reduced in volume. By disengaging the catch 10 from the arm 9 the apparatus will be thrown out of operative adjustment, and the movement of the lever 6 will not affect the rod 11. When the parts drop, as shown in Fig. 3, the force of the weight 45 will resist that of the spring 47 and hold the dog 39 in the position indicated in said figure. When the rod 19 again rises, the chain 46 becomes taut, and bearing the weight of the part 45 the chain relieves the dog 39, and the spring 47 throws the arm 41 and dog 39 back to the position shown in Figs. 1 and 2. When the lever 6 returns to its position as shown in Fig. 1, the rod 19 is also moved up and the dog 39 passes above the tank 16 to the position shown in Fig. 1, ready for a second operation.

Having thus described my invention, I claim as new and desire to secure by Letters Patent—

1. The combination of a vertically-movable rod normally suspended in an upward position, a dog pivotally carried on the rod, a stationary object against which the dog may bear to retard the descent of the rod, means for yieldingly holding the dog in active position, a pan having connection with the rod, means for supplying water to the pan, a pipe passing from the pan and communicating therewith to carry the water therefrom, and a valve commanding the outflow from said pipe.

2. The combination of a vertically-movable rod, a dog pivotally mounted thereon, a stationary object against which the dog may bear to retard the downward movement of the rod, a lever mounted on the rod, a weight actuating the lever, a flexible connection between the lever and the said stationary object, a yielding arm attached to the lever and adapted to be thrown thereby into engagement with the dog, a pan carried by the rod, means for supplying water to the pan, a pipe communicating with and leading the water from the pan, and a valve controlling the outflow from said pipe.

3. In a water-supply regulator, the combination with means for conducting the water to the regulator, of a beam mounted to swing and connected with the motor, a rod in connection with the beam, a pan attached to the rod and primarily receiving the water, a pipe extending from the pan, a tank to receive the water from the pipe, a valve commanding the pipe and closing the same to back the water into the pipe when the tank is full, the pan being adapted to drop when the water backs therein and the dropping of the pan serving to draw down the rod and the beam to which it is attached, a detent mounted on the rod, a stationary object adapted to be engaged with the detent to temporarily arrest the descent of the rod and the attached pan, and means for holding the detent engaged with said stationary object.

4. In a water-supply regulator, the combination with means for conducting the water to the regulator, of a pan receiving the water from said means, a pipe communicating with the pan and receiving the water therefrom, a tank to which the pipe extends, a valve situated at the tank and commanding the pipe and closing the same to back the water into the pipe when the tank is full, the water passing through the pan and pipe on its way to the tank, and means attached to the pan, such means serving to transmit the movement thereof to the motor, the pan being adapted to drop and move said means as the water backs in the pan.

5. In a water-supply regulator, the combination with means for conducting the water to the regulator, of a beam mounted to swing, a connection between the beam and the motor, a rod in connection with said beam, a pan attached to the rod, the pan being adapted to drop when the water backs therein, thus moving with it the rod and beam, a pipe communicating with the pan and serving to conduct the water therefrom, a tank to which said pipe leads and a valve at the tank and commanding the pipe and closing the same to back the water into the pipe when the tank is full, the pan being arranged to primarily receive the water from the said means for conducting it to the regulator, and the water passing through the pan and pipe.

6. The combination with a water-supply regulator of a beam mounted to swing and connected therewith to be actuated thereby, an arm having one end pivotally connected with the beam, a catch mounted on the beam and serving to removably engage the free end of the arm by which to hold the arm rigid on the beam essentially in parallelism therewith, and a rod or other connection attached to the arm and adapted to be actuated by the movement of the beam through the medium of the arm when the arm is held by the catch.

7. The combination with a reservoir, of a pipe leading thereto, a valve-seat mounted at the upper end thereof, a valve bearing on the seat, a lever and float situated within the reservoir, the lever bearing on the valve to close
5 the same when the float is water-borne, and a second float attached to the valve and extending down within the pipe, a second float being raised by water within the pipe and serving to hold the valve in closed position when the pipe is emptied.

FREDERICK S. SEYMOUR.

Witnesses:
W. A. LEATHERS,
R. E. WILKINSON.